(12) United States Patent
Ryu et al.

(10) Patent No.: US 7,356,801 B2
(45) Date of Patent: Apr. 8, 2008

(54) STANDARD PLATFORM FOR NETWORK TECHNOLOGY GROUP AND APPLICATION METHOD THEREOF

(75) Inventors: Juhn-Seok Ryu, Seongnam (KR); Han-Seung Park, Seoul (KR); Hyun-Soo Kim, Yongin (KR); Keum-Hwa Jung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 868 days.

(21) Appl. No.: 10/372,925

(22) Filed: Feb. 26, 2003

(65) Prior Publication Data

US 2003/0177185 A1    Sep. 18, 2003

(30) Foreign Application Priority Data

Mar. 14, 2002 (KR) .................. 10-2002-0013853

(51) Int. Cl.
G06F 9/44 (2006.01)
G06F 3/00 (2006.01)
(52) U.S. Cl. .................. 717/106; 719/321; 719/328
(58) Field of Classification Search ............ None
See application file for complete search history.

(56) References Cited

U.S. PATENT DOCUMENTS

| | | | |
|---|---|---|---|
| 5,923,878 A | | 7/1999 | Marsland |
| 6,012,095 A | * | 1/2000 | Thompson et al. ......... 709/231 |
| 6,167,403 A | * | 12/2000 | Whitmire et al. ............ 707/10 |
| 6,195,091 B1 | | 2/2001 | Harple et al. |
| 6,236,643 B1 | * | 5/2001 | Kerstein .................. 370/254 |
| 6,393,481 B1 | | 5/2002 | Deo et al. |
| 6,430,612 B1 | * | 8/2002 | Iizuka ...................... 709/223 |
| 6,434,594 B1 | | 8/2002 | Wesemann |
| 6,460,178 B1 | | 10/2002 | Chan et al. |
| 6,754,181 B1 | * | 6/2004 | Elliott et al. ............... 370/252 |
| 7,024,421 B2 | * | 4/2006 | Mokuya et al. ............. 707/102 |
| 2002/0161935 A1 | * | 10/2002 | Blaisdell ..................... 709/331 |
| 2003/0074436 A1 | * | 4/2003 | Gieseke ..................... 709/223 |
| 2003/0105886 A1 | * | 6/2003 | Tsarfati ..................... 709/321 |

(Continued)

OTHER PUBLICATIONS

DeYoung, William A; Chatterjee, Amelendu; "Fujitsu-NYNEX Joint Research Common Broadband Management Platform", 1993 IEEE retrieved Aug. 30, 2006.*

(Continued)

Primary Examiner—Mary Steelman
(74) Attorney, Agent, or Firm—Robert E. Bushnell, Esq.

(57) ABSTRACT

The present invention discloses a standard platform for a network technology group, wherein a common element, a common module, is generated in each of the technology groups applied in a predetermined software system, such as a synchronous digital hierarchy SDH, a plesiochronous digital hierarchy PDH, an asynchronous transfer mode ATM, an Internet protocol IP, a voice over packet VoP, an inverse multiplexing over asynchronous transfer mode IMA, or a digital subscriber line and its variations xDSL, including hierarchically a function block defined by each function of a message conversion and of a connection process in each block of the technology groups, a management group of the function block, a sub-structure of the function block, classified according to the role within each function block, and a management element, a minimum unit of the common module in each of the technology groups, including actual structure contents, classified differently according to the management group.

21 Claims, 6 Drawing Sheets

U.S. PATENT DOCUMENTS

2006/0059253 A1* 3/2006 Goodman et al. .......... 709/223

OTHER PUBLICATIONS

Kiriha, Yoshiaki; Nakai, Shoichiro; Arima, Keiko; Kuriyama, Hiroshi; "An Automatic Generation of Management Information Base (MIB) for OSI based Network Management System", p. 0640-0653, 1991 IEEE, retrieved Aug. 30, 2006.*

Naoto Miyauchi Tetsuo Nakakawaji Kotaro Katusyama Tadanori Mizuno, "An Implementation of Management Information Base", p. 318-321, 1991 IEEE, retrieved Aug. 30, 2006.*

Keller, Rudolf K; Tessier, Jean; von Bochmann, Gregor; "A Pattern System for Network Management Interfaces", p. 86-93, 1998 ACM, retrieved Aug. 30, 2006.*

Kim, Dong Won; Kim, Sang Joong; Ryu, Geun Teak; Bae, Hyeon Deok; "Design and Implementation of Common ATM Interface Module for B-ISDN Terminal and Network Adaptors", p. 158-159, 1996 IEEE, retrieved Feb. 22, 2007.*

Park, J.T.; Cho, Y.H.; "A Generic Manager / Agent Architecture for TMN Applications", p. 794-798, 1994 IEEE, retrieved Feb. 22, 2007.*

Lee, Seok Ho; Woo, Wang Don; Kim, Won Su; Lim, Jai Jin; "A Proposal on Design Scheme of TMN NEML Management Application Framework for ATM Switching Systems", p. 1180-1184, 1997 IEEE, retrieved Feb. 22, 2007.*

* cited by examiner

← System Actor — Vertical Component →

```
Struct {
    INT32              faulted;
    V_PRV_USAGE_E      usagePrv;
    V_INT32            maxIndex;
    V_FAULT_STATE_T    currentState;
    V_FAULT_STATE_T    previousState;
    ~~V_STATE_E         currentState;~~
    ~~V_STATE_E         previousState~~

V_CALLBACK_LIST_T  *pReadBareCBList;
    V_CALLBACK_LIST_T  *pNotiGenCBList;
    V_CALLBACK_LIST_T  *pNotiRIsCBList;
}V_FAULT_CLASS_T;
```

FIG. 5B

```
struct{
    V_INT32                 perfId;
    V_PRV_USAGE_E           usagePrv;
    V_INT32                 maxIndex;              // 2001.05.09
    V_INT32                 sesThValue;
    V_PERF_MONITOR_TYPE_E   monitorType;
    V_INT32                 monitorPeriod;
    V_PERF_END_TYPE_E       endType,
    V_PERF_UAS_DIRECTION_MODE_E  uasMode;

V_PERF_CLASS_T    *pNearNext;

V_CALLBACK_LIST_T       *pReadBareCBList;
    V_CALLBACK_LIST_T       *pReadDefectCBList;
    V_CALLBACK_LIST_T       *pReadFailureCBList;   //2001.05.08
    V_CALLBACK_LIST_T       *pUpdateCBList;

V_CHAR_P                pBareData;             // 2001.05.09
    V_CHAR_P                pFloatData;            // 2001.05.09
    V_CHAR_P                pFixedData;            // 2001.05.09

V_PERF_BARE_DATA_T      *pBareData;
    V_PERF_FLOAT_DATA_T     *pFloatData;
    V_CHAR_P                pFixedData;

}V_PERF_CLASS_T;
```

FIG. 5C

```
typedef struct
{
    V_TEST_ID_E            testId;
    V_PRV_USAGE_E          usagePrv;
    V_TEST_KIND_E          testKind;
                           //(SDH_LL,SDH_RL,ATM_CC,ATM_PM...)
    V_STATE_E              currentState;          //ON,OFF,RUN
    V_TEST_ACT_STATE_T     actionState;
                           //successful , problem cause
    V_CHAR_P               pTestInfo;
            //V_TEST_SDH_XXX_INFO_T,
                    //V_TEST_ATM_XXX_INFO_T
                    //(XXX:LB,CC,PM ...)
    V_CALLBACK_LIST_T      *pReadCBList;
    V_CALLBACK_LIST_T      *pWriteCBList;
    V_CALLBACK_LIST_T      *pReactionCBList;
            // AIS insert etc...

}V_TEST_CLASS_T;
```

FIG. 5D

```
typedef struct
{
    V_CLOCK_ID_E              clockId;
    V_PRV_USAGE_E             usagePrv;
                              //semophore function for preventing
                              user command during monitoring
    V_CLOKC_TYPE_E            oprClockMode;
    V_CLOCK_SOURCE_TYPE_CLASS_T  *pSourceClock;
    V_CLOCK_SELECTED_CLASS_T     *pSystemClock;
    V_CLOCK_SELECTED_CLASS_T     *pDerivedClock;

}V_CLOCK_CLASS;
```

STANDARD PLATFORM FOR NETWORK TECHNOLOGY GROUP AND APPLICATION METHOD THEREOF

CLAIM OF PRIORITY

This application makes reference to, incorporates the same herein, and claims all benefits accruing under 35 U.S.C. §119 from an application for STANDARD PLATFORM OF NETWORK EQUIPMENTS AND METHOD FOR USING THEREOF earlier filed in the Korean Industrial Property Office on Mar. 14, 2002 and there duly assigned Serial No. 2002-13853.

BACKGROUND OF THE INVENTION

1. Field of the Invention

The present invention relates to a platform for a network technology group, and more particularly, to a standard platform for a network technology group having a common software element, a common module, applied easily to various technology groups, such as a synchronous digital hierarchy SDH, a plesiochronous digital hierarchy PDH, an asynchronous transfer mode ATM, an internet protocol IP, a voice over packet VoP, an inverse multiplexing over asynchronous transfer mode IMA, or a digital subscriber line and its variations xDSL.

2. Description of the Related Art

Generally, a software system in a network technology group embodies and maintains a hierarchical signal and a protocol defined by an international standard such as Management Information Base MIB.

However, the hierarchical signal and the protocol are various according to the kind of the software system in the network technology group. Therefore, even though the network technology group is the same, an applied hierarchical signal and an applied protocol can be different. As a result, the standard hierarchical signal and the standard protocol defined by the international standard such as MIB are used in congestion, even though the same software system, platform, is applied to the same kind of a network technology group.

FIG. 1 is a configuration of a software system installed in each of the technology groups.

Referring to FIG. 1, to construct a network under surroundings of XXX software system (platform), the software system is applied to the kind of the technology groups, for example, XXX ATM, XXX SDH, XXX IP, XXX xDSL, etc. Additionally, to construct a network under surroundings of YYY software system (platform), the software system is applied to the kind of the technology groups, for example YYY ATM, YYY SDH, YYY IP, YYY xDSL, etc. In the same way, to construct a network under surroundings of ZZZ software system (platform), the software systems are applied to the kind of the technology groups, for example ZZZ ATM, ZZZ SDH, ZZZ IP, ZZZ xDSL, etc.

Therefore, a system developer has to develop a software system according to the kind of a predetermined technology group to be applied to new platform because a standard and common software system does not exist for the predetermined technology group.

As a result, the conventional network technology group has the following problems because a software system is applied to the predetermined technology group, while a system-dependent software element is not distinguished from system-independent software element.

At first, because the software system for the predetermined technology group is embodied by the intuition of a system developer, it is limited to develop or maintain the software system in the predetermined technology group according to modification of the system platform.

Secondly, because the conventional software system is developed by a system developer-oriented method, various software systems are maintained in a platform according to the various technology groups.

Thirdly, it is difficult to install the conventional software system used in a technology group to other technology groups because the technology groups vary.

Finally, development resources are duplicated and development time is delayed, because common software is not shared among various technology groups.

SUMMARY OF THE INVENTION

To overcome the above described and other problems, preferred embodiments of the present invention provide a standard platform for a network technology group and application method thereof having a library, a module, by separating a system-independent software system from a system-dependent software system so as to be installed easily to various technology groups.

It is another object to provide a standard platform for a network technology group and application method of the standard platform for the network technology group which can reduce costs and increase efficiency.

In order to achieve the above and other objects, the preferred embodiments of the present invention provide a standard platform for a network technology group, by generating a common element, a common module, in each of the technology groups applied in a predetermined software system, including hierarchically: a function block defined by each function of a message conversion and of a connection process in each block of the technology groups; a management group of the function block, a sub-structure of the function block, classified according to the role within each function block; and a management element, a minimum unit of the common module in each of the technology groups, including actual structure contents, classified differently according to the management group.

The common module is formed according to an international standard, such as Management Information Base or MIB.

The management group is classified as a fault, a configuration, an account, a performance, a security, a reliability, a test, or a clock group according to role functions.

The management element includes: a different structure according to the characteristic of the corresponding management group; and several common fields.

The common fields of the management element includes: a meterID, an identifier of the management element, determined through a profile or an application program interface API by a user setting value for the common module of a technology group; a usagePrv, a value for determining whether the manage element is used or not, determined through the profile or the API by the user for the common module of the technology group; and a maxIndex determined through the profile or the API by the user for the common module of the technology group.

The common field, maxIndex, of the management element is 1 when the single management element contains a single physical port; the common field, maxIndex, of the management element is more than 1 when the single management element contains multiple physical ports; and the structure and the procedure method within the management element can be changed according to the value in the common field, maxIndex.

The API controls the function block, the management group, or the management element; and the API performs a function of creating, deleting, registering, searching, setting, or monitoring the function block, the management group, or the management element.

The common module is provided as a profile structure to assist the creating function of the API.

The profile structure includes necessary data for generating a corresponding element, and is provided as a header file to the user of the common module.

The registration function of the API function registers a callback function of a linked list structure recoded by the user within the common module, and is not responsible for contents of the callback function, but responsible for calling the callback function in the case of the happening or occurrence of a predefined events.

Another purpose of the present invention is to provide an application method of a standard platform for a network technology group, including the steps of: constructing a software build including a common module corresponding to a function block or a technology group contained logically within the constructing system; setting the software build appropriately by receiving a profile structure of the corresponding function block through a header file; generating a function block, a management group, and a management element through a creation API according to setting conditions; monitoring the software build by calling a monitoring API periodically; and searching or upgrading the setting value through a searching and a setting API when a user requests.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5B is a structure example of a performance management element according to the preferred embodiment of the present invention;

FIG. 5C is a structure example of a test management element according to the preferred embodiment of the present invention; and FIG. 5D is a structure example of a clock management element according to the preferred embodiment of the present invention.

DETAILED DESCRIPTION OF THE REFERRED EMBODIMENTS

Reference will now be made in detail to preferred embodiments of the present invention, an example of which is illustrated in the accompanying drawings.

Figure 1:
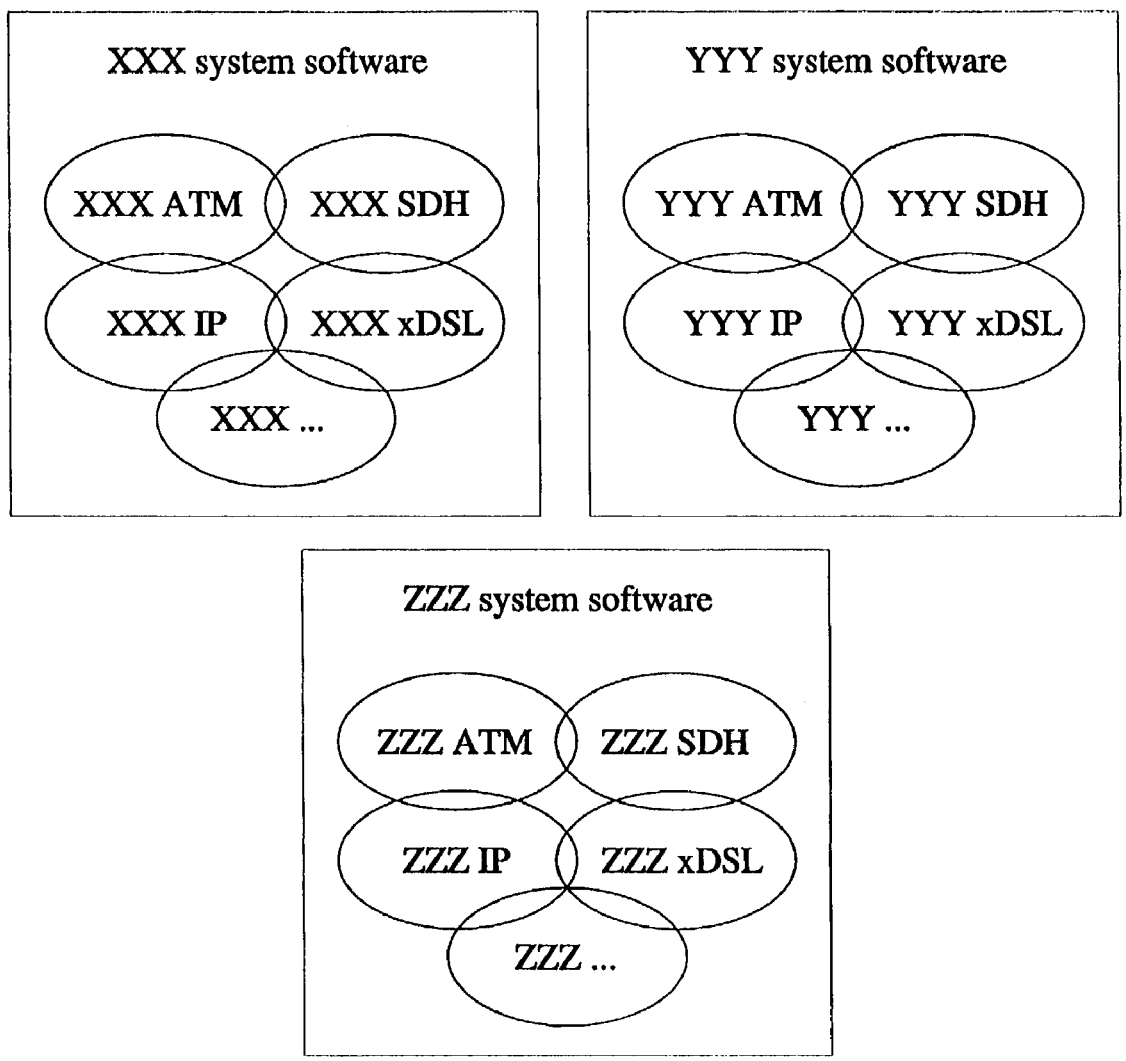
FIG. 1 is a configuration of the conventional software system installed in each of technology groups.
Figure 2:
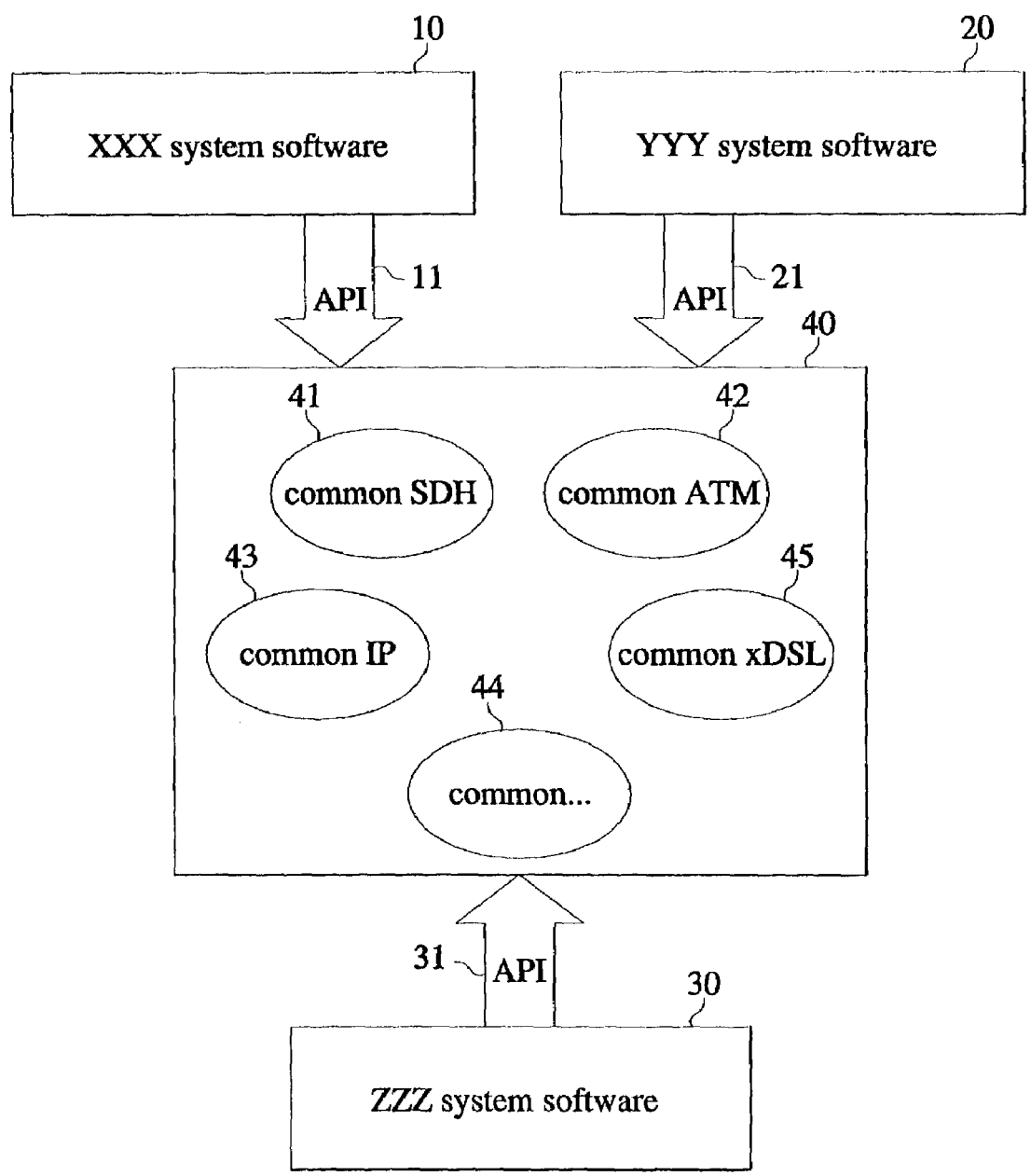
FIG. 2 shows the configuration of a software system having common software elements, common modules, in each technology group, and interfacing with software systems through an application program interface API according to a preferred embodiment of the present invention.

FIG. 2 shows the configuration of a software system having common software elements, common modules, in each technology group, and interfacing with software systems through an application program interface API according to a preferred embodiment of the present invention.

Referring to FIG. 2, common software elements 41~45 from each of software systems such as XXX 10, YYY 20, and ZZZ 30 are generated as a library or a module 40. Therefore, a system software developer for the XXX software system 10, the YYY software system 20, and the ZZZ software system 30 can use the library 40 through an application program interface API 11, 21, or 31.

In the following statements, configuration and operation according to the present invention will be illustrated to generate common software elements 41~45 as a common module 40.

A technology group of the present invention includes SDH (synchronous digital hierarchy), PDH (plesiochronous digital hierarchy), IMA (inverse multiplexing over asynchronous transfer mode), ATM (asynchronous transfer mode), VoP (voice over packet), IP (Internet protocol), or xDSL (x-digital subscriber line, generic name of a variety of digital subscriber line services).

To isolate a system-independent software element from a system-dependent software element within the above described large classified technology group, the technology group is divided into several functional blocks, and those functional blocks generate a minimum common element of the technology group, a library (a module).

Figure 3:
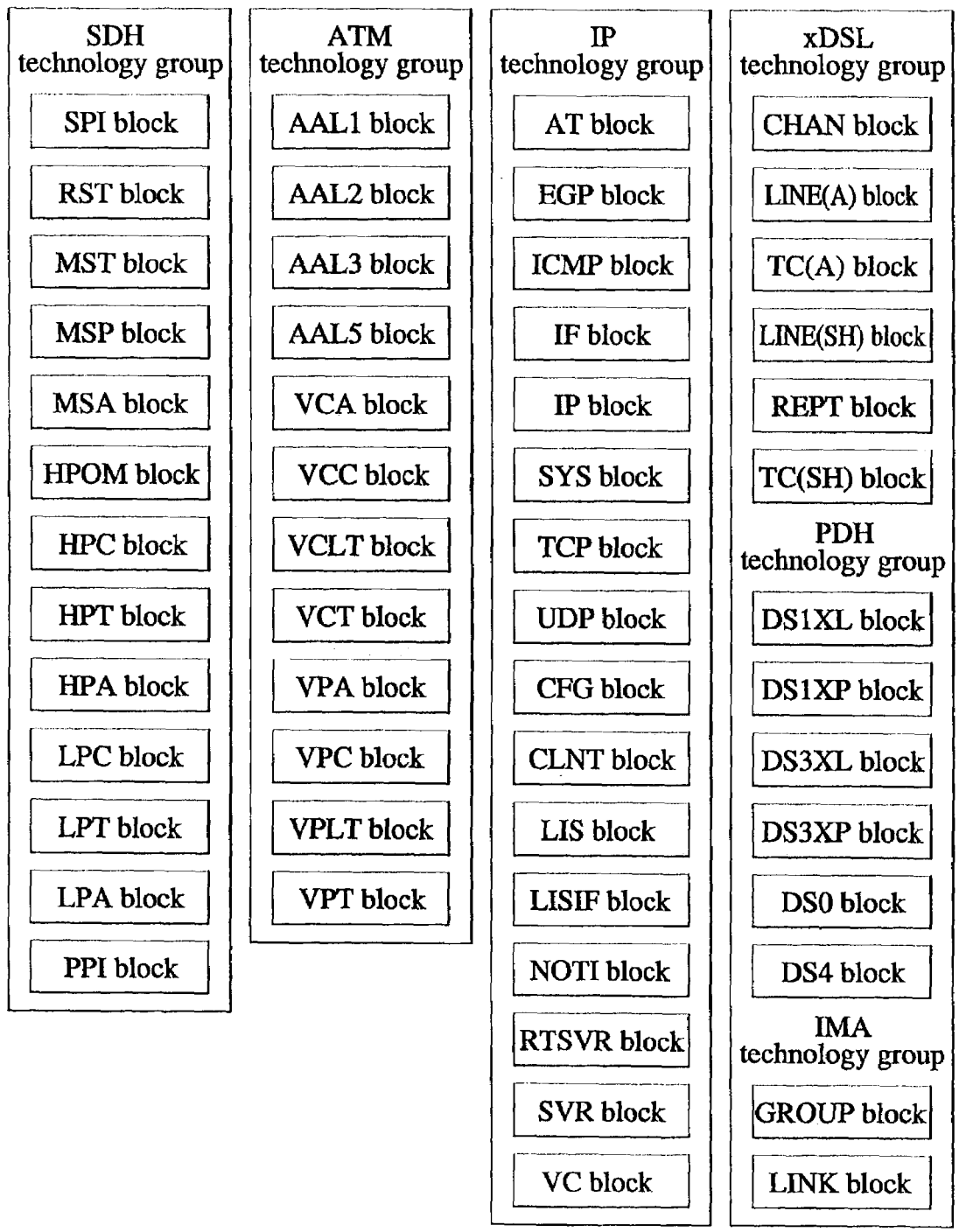
FIG. 3 is a block diagram illustrating function blocks of each technology group isolated to embody a software system according to the present invention.

FIG. 3 is a block diagram illustrating function blocks of each technology group isolated to embody a software system according to the present invention.

Referring to FIG. 3, the technology group SDH includes function blocks, such as SPI, RST, MST, MSP, MSA, HPOM, PPC, HPT, HPA, LPC, LPT, LPA, or PPI, and the technology group ATM includes function blocks, such as AAL1, AAL2, AAL3, AAL5, VCA, VCC, VCLT, VCT, VPA, VPC, VPLT, or VPT.

The functional blocks for the technology groups IP, xDSL, PDH, or IMA are the same block illustrated in FIG. 3, and a detail explanation for the functional blocks will be omitted.

The role of each function block for the technology group ATM is described in the following statement.

1. AAL5/AAL3/AAL2/AAL1 (Asynchronous transfer mode Adaption Layer 5, 3, 2 and 1, respectively): These layers convert an ATM Adaption block, an ATM cell, to the corresponding message such as an IP packet or an X.25 packet.
2. VPA/VCA (Virtual Path Adaption/Virtual Channel Adaption): VP/VC application block.
3. VCC (Virtual Channel Connection): VC connection block.
4. VCLT (Virtual Channel Link Termination): VCL process block.
5. VCT (Virtual Channel Termination): VC process block.
6. VPC (Virtual Path Connection): VP connection block.

7. VPT (Virtual Path Termination): VP process block.
8. VPLT (Virtual Path Link Termination): VPL process bock.
9. TP/VPA (Transmission Path/Virtual Path Adaption): TP/VP application block.

As described in the above statement, the function blocks in each technology group are generated for each function, such as a message change function or a connection process function.

Figures 4, 5A:
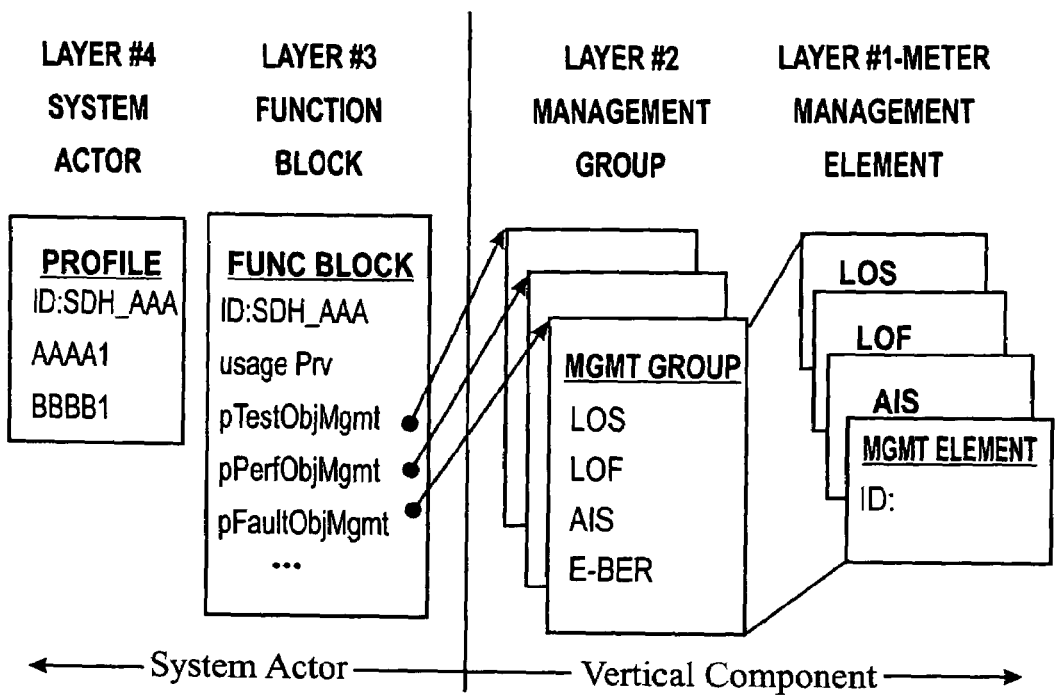
FIG. 4 is a diagram illustrating a hierarchy of a common module in each technology group for embodying a software system according to the present invention.
FIG. 5A is a structure example of a fault management element according to the preferred embodiment of the present invention.

FIG. 4 is a diagram illustrating a hierarchy of a common module in each technology group for embodying a software system according to the present invention.

Referring to FIG. 4, a function block includes a hierarchical management group as a sub-structure, and the management group is divided by according to roles within the function block, such as fault, configuration, account, performance, security reliability, test, or clock group. The management group has a different shape and size according to technology groups and function blocks.

The management group includes more than one management element as a sub-structure. The management element is the minimum unit of a common module in a technology group, and is classified differently according to the corresponding management group.

In this case, API controls each of the function blocks, the management groups, and the management elements.

The API includes a creation function, a deletion function, a registration function, a getting function a setting function, and a monitoring function. The creation function generates a function block, a management group and a management element, and the deletion function deletes the function block, the management group and the management element. The registration function registers a callback function of a linked list structure to the function block, the management group and the management element, the getting function searches contents of the function block, the management group and the management element, and the setting function defines the contents of the function block, the management group and the management element. In addition, the monitoring function performs a function-defined process by using the contents of the function block, the management group and the management element, and performs appropriate procedures relative to the results thereof.

To assist the creation function, the common module provides a profile structure. The profile structure, provided as a header file to a system developer, contains necessary data in generating a corresponding element of the common module.

The management element is the minimum unit in the common module of the technology group, and contains actual structure contents. Even though it has a different structure according to the characteristic of the management group, the management element includes common fields as illustrated in the following statements.

To assist the creation function, the common module provides a profile structure. The profile structure provided as a header file to a system developer contains necessary data in generating a corresponding element of the common module.

The management element is the minimum unit in the common module of the technology group, and contains actual structure contents. Even though having different structure according to the characteristic of the management group, the management element includes common fields as illustrated in the following statements.

One of the common fields, meterID (meter identifier), is an identifier of the management element determined through the profile or the API by a system developer for the common module of the technology group.

Another common field, usagePrv (usage previous), is a value for determining whether the manage element is used or not, and is determined through the profile or the API by the system developer for the common module of the technology group.

Additionally, another common field, maxIndex (maximum index), is a value for determining whether a single management element contains a single physical port or not. For example, when the common field, maxIndex, is 1, then the single management element contains a single physical port. When the common field, maxIndex, is more than 1, then the single management element contains multiple physical ports. The structure and the procedure method within the management element can be changed according to the value in the common field, maxIndex. The common field, maxIndex, is determined through the profile and the API by the system developer for the common module of the technology group.

According to the above described conditions, among the profile structure corresponding to the common module, the structure of a fault management element is illustrated in FIG. 5A, the structure of a performance management element is illustrated in FIG. 5B, the structure of a test management element is illustrated in FIG. 5C, and the structure of a clock management element is illustrated in FIG. 5D.

When a system developer develops a new platform by using the above described common module of the technology group, the following procedure will be performed.

At first, it is necessary to construct a software build, including a common module corresponding to a technology group or a function block contained logically in a constructing system.

Secondly, a profile structure relative to the corresponding function block, such as FIG. 5A to FIG. 5D, is provided through a header file, set to fit the constructing system, and generated through a generation API.

Finally, a defined function is performed by calling a performing function API periodically, and a user searches or changes the set-value through the getting/setting API when requested by the user.

As described in the above statements, the standard platform embodying method for a network technology group according to the present invention provides the following effects.

At first, it is easy to develop a module for new network technology group when a user provides information required for the new technology group as a profile.

Secondly, a library, a module, is embodied according to the kind of technology group. Therefore, when it is necessary to include a technology group related to the existing network, a library corresponding to the technology group is only applied. As a result, unnecessary parts are eliminated so as to guarantee efficient re-usage, and to minimize the size of software programs.

Finally, a trace module and a memory module independent from any other technology group can be applied to any technology group, and can be easily tested in the case of adding new technology group.

While the invention has been particularly shown and described with reference to preferred embodiments thereof, it will be understood by those skilled in the art that the foregoing and other changes in form and detail may be made therein without departing from the spirit and scope of the invention.

While the invention has been particularly shown and described with reference to preffered embodiments thereof, it will be understood by those skilled in the art that the foregoing and other changes in form and details may be made therein without departing from the spirit and scope of the invention.

What is claimed is:

1. A computer-readable module stored on a computer-readable medium, comprising a standard platform for network technology groups, wherein a common element, a common module, is generated in each of the technology groups applied in a predetermined software system, said standard platform comprising hierarchically:
   a function block defining a function for at least one of a message conversion and a connection process in each block of the technology groups;
   a management group of the function block classified as a sub-structure of the function block according to its role within each function block; and
   a management element, as a minimum unit of the common module in each of the technology groups, defined by structure content values, and classified by corresponding management group.

2. The computer-readable module according to claim 1, the common module being generated according to an international standard of management information base.

3. The computer-readable module according to claim 1, the management group being classified into one of a fault, an account, a security, a reliability, and a clock group according to role functions.

4. The computer-readable module according to claim l,the management element comprising:
   a different structure formed according to a characteristic of a corresponding management group; and
   a plurality of common fields.

5. The computer-readable module according to claim 1, common fields of the management element comprising:
   a meterID, an identifier of the management element, determined through one of a profile and an application program interface by a user setting value for the common module of a technology group;
   a usagePrv, a value determining whether the management element is used or not, determined through one of the profile and the application program interface by the user for the common module of the technology group; and
   a maxIndex determined through one of the profile and the application program interface by the user for the common module of the technology group.

6. The computer-readable module according to claim 5, wherein:
   when a common field, maxIndex, of the management element is 1, a single management element contains a single physical port;
   when the common field, maxIndex, of the management element is more than 1, the single management element contains multiple physical ports; and
   a structure and a procedure method within the management element can be changed according to a value in the common field, maxIndex.

7. The computer-readable module according to claim 1, wherein the function block, the management group, and the management element are controlled by an application program interface; and
   wherein the application program interface performs at least one of creating, deleting, registering, searching, setting, and monitoring at least one of the function block, the management group, and the management element.

8. The computer-readable module according to claim 7, the common module being provided as a profile structure to assist in the creating function of the application program interface.

9. The computer-readable module according to claim 8, the profile structure including necessary data for generating a corresponding element and being provided as a header file to a user of the common module.

10. The computer-readable module according to claim 7, wherein the registering performed by the application program interface registers a callback function of a linked list structure recorded by the user within the common module and is not responsible for contents of the callback function, but is responsible for calling the callback function in the case of occurrence of a predefined event.

11. A method of a standard platform build for a network technology group, comprising the steps of:
   constructing a software build, including a common module corresponding to one of a function block and a technology group contained logically within a constructing system;
   receiving a profile structure for setting condition values for a corresponding function block in a header file;
   generating a function block, including a management group, and a management element through a creation application program interface, and applying the setting condition values;
   monitoring the software build by calling a monitoring application program interface periodically; and
   performing one of searching and upgrading a setting condition value through a respective one of a searching and a setting application program interface in response to a user request.

12. A method of providing a standard platform for a network technology group by generating a software build of a common element, in a common module, for each of a plurality of technology groups, comprising the steps of:
   defining a function block by at least one of a function of a message conversion and a function of a connection process;
   defining and classifying a management group of the function block as a sub-structure of the function block according to a role within each function block;
   defining and setting data values of a management element using structure content data provided by the method; and
   classifying differently, according to the management group, a management element as a minimum unit of the common module in each of the technology groups.

13. The method of claim 12, the common module being comprised according to an international standard of management information base.

14. The method of claim 13, the management group being classified into a fault, a configuration, an account, a performance, a security, a reliability, a test, and a clock group according to role functions.

15. The method of claim 14, the management element comprising:
   a different structure formed according to a characteristic of a corresponding management group; and
   a plurality of common fields.

16. The method of claim 15, common fields of the management element comprising:

an identifier of the management element determined through one of a profile and an application program interface by a user setting value for the common module of a technology group;

a usage value for determining whether the management element is used through one of the profile and the application program interface by the user for the common module of the technology group; and a first index determined through one of the profile and the application program interface by the user for the common module of the technology group.

17. The method of claim 16, further comprising the steps of:

containing a single physical port in a single management element when the common field, a second index, of the management element is 1;

containing multiple physical ports in the single management element when the common field, the second index, of the management element is more than 1; and changing a structure and a procedure method within the management element according to the value in the common field, the second index.

18. The method of claim 17, further comprising the steps of:

controlling the function block, the management group, and the management element by an application program interface; and performing, by the application program interface, the functions of creating, deleting, registering, searching, setting, and monitoring the function block, the management group, and the management element.

19. The method of claim 18, the common module being provided as a profile structure to assist in the creating function of the application program interface.

20. The method of claim 19, the profile structure including necessary data for generating a corresponding element and being provided as a header file to the user of the common module.

21. The method of claim 20, wherein the registration function of the application program interface function registers a callback function of a linked list structure recorded by the user within the common module, and is not responsible for contents of the callback function, but is responsible for calling the callback function in the case of occurrence of a predefined event.

* * * * *